United States Patent
De Prins et al.

(10) Patent No.: US 11,154,846 B2
(45) Date of Patent: Oct. 26, 2021

(54) COPPER CONTAINING MOZ ZEOLITE FOR SELECTIVE NOX REDUCTION CATALYSIS

(71) Applicant: Umicore AG & Co. KG, Hanau-Wolfgang (DE)

(72) Inventors: Michiel De Prins, Vosselaar (BE); Johan Adriaan Martens, Huldenberg (BE); Elke Jane June Verheyen, Heverlee (BE); Stef Jules Peter Kerkhofs, Hoogstraten (BE); Sreeprasanth Pulinthanathu Sree, Heverlee (BE); Frank-Walter Schuetze, Aschaffenburg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 16/479,593

(22) PCT Filed: Feb. 9, 2018

(86) PCT No.: PCT/EP2018/053307
§ 371 (c)(1),
(2) Date: Jul. 20, 2019

(87) PCT Pub. No.: WO2018/149749
PCT Pub. Date: Aug. 23, 2018

(65) Prior Publication Data
US 2019/0358614 A1   Nov. 28, 2019

(30) Foreign Application Priority Data
Feb. 17, 2017   (EP) ..................... 17156790

(51) Int. Cl.
*B01J 29/06*   (2006.01)
*B01J 29/76*   (2006.01)
(Continued)

(52) U.S. Cl.
CPC .......... *B01J 29/76* (2013.01); *B01D 53/9418* (2013.01); *B01J 37/08* (2013.01); *B01J 37/30* (2013.01); *C01B 39/48* (2013.01); *F01N 3/2066* (2013.01); *B01D 2255/202* (2013.01); *B01D 2255/204* (2013.01); *B01D 2255/2022* (2013.01); *B01D 2255/2025* (2013.01); *B01D 2255/2027* (2013.01); *B01D 2255/2042* (2013.01); *B01D 2255/2045* (2013.01); *B01D 2255/20761* (2013.01); *B01D 2255/50* (2013.01);
(Continued)

(58) Field of Classification Search
CPC ...... B01J 29/76; B01J 2229/186; B01J 37/08; B01J 37/30; F01N 3/2066; C01B 39/48; C01P 2004/03; B01D 53/9418; B01D 2255/20761; B01D 2255/202; B01D 2255/2022; B01D 2255/2025; B01D 2255/2027; B01D 2255/2047; B01D 2288/2045; B01D 2255/2042; B01D 2255/204; B01D 2255/50; B01D 2258/01; B01D 2257/404
USPC ............ 502/60, 63, 64, 69, 71, 77; 423/700, 423/713; 422/168, 177, 180
See application file for complete search history.

(56) References Cited

U.S. PATENT DOCUMENTS

| | | | | |
|---|---|---|---|---|
| 2008/0127634 | A1* | 6/2008 | Cho | B01J 23/50 60/286 |
| 2012/0028789 | A1* | 2/2012 | Matsuo | B01J 37/0009 502/74 |
| 2012/0110988 | A1* | 5/2012 | Dotzel | C04B 35/6365 60/299 |

(Continued)

FOREIGN PATENT DOCUMENTS

| | | |
|---|---|---|
| CN | 105562069 A | 5/2016 |
| CN | 105749960 A | 7/2016 |
| JP | 2881805 B2 | 4/1999 |

OTHER PUBLICATIONS

International Search Report received in PCT/EP2018/053307 dated Mar. 1, 2018.

(Continued)

*Primary Examiner* — Elizabeth D Wood
(74) *Attorney, Agent, or Firm* — Suzannah K. Sundby, Esq.; Canady + Lortz LLP

(57) ABSTRACT

The present invention relates to crystalline aluminosilicate comprising a MOZ framework type material. The MOZ framework type material comprises between 0.1 and 12.5 wt-% of copper, calculated as CuO, and one or more alkali and alkaline earth metal cations in an amount of 0.3 to 9 wt.-%, calculated as pure metals. The process for making the copper containing MOZ type zeolites comprises a) preparing a first aqueous reaction mixture comprising a silica source and potassium hydroxide, b) preparing a second reaction mixture comprising an alumina source, potassium hydroxide and a structure-directing agent selected from N,N-1,4-dimethyl-1,4-diazabicyclo-[2.2.2]octane difluoride, dichloride, dibromide, diiodide or dihydroxide, c) combining the two aqueous reaction mixtures, d) aging the combined reaction mixtures, e) heating the combined reaction mixtures, e) recovering, washing and drying the zeolite obtained thereof, g) calcining the zeolite, f) introducing copper, and i) washing and drying the copper containing MOZ type zeolite. Furthermore, the present invention discloses a washcoat comprising the copper containing MOZ framework type material, an SCR catalyst comprising said copper containing MOZ framework type material, and an exhaust gas purification system containing said SCR catalyst.

16 Claims, 2 Drawing Sheets

(51) Int. Cl.
    *B01D 53/94* (2006.01)
    *B01J 37/08* (2006.01)
    *B01J 37/30* (2006.01)
    *C01B 39/48* (2006.01)
    *F01N 3/20* (2006.01)

(52) U.S. Cl.
    CPC .... *B01D 2257/404* (2013.01); *B01D 2258/01* (2013.01); *B01J 2229/186* (2013.01); *C01P 2004/03* (2013.01)

(56) References Cited

U.S. PATENT DOCUMENTS

| | | | | |
|---|---|---|---|---|
| 2012/0117952 | A1* | 5/2012 | Dotzel | B01J 35/04 60/295 |
| 2014/0072490 | A1* | 3/2014 | Dotzel | B01J 23/30 423/212 |
| 2015/0133287 | A1* | 5/2015 | Matsuo | B01J 35/006 502/60 |
| 2015/0367337 | A1* | 12/2015 | Yang | B01J 37/0246 423/239.2 |
| 2016/0129431 | A1* | 5/2016 | Bull | B01D 53/9418 423/700 |

OTHER PUBLICATIONS

Written Opinion received in PCT/EP2018/053307 dated Mar. 1, 2018.

* cited by examiner

COPPER CONTAINING MOZ ZEOLITE FOR SELECTIVE NOX REDUCTION CATALYSIS

The present invention relates to a copper-containing MOZ-type zeolite for use in the selective catalytic reduction of nitrogen oxides by reaction with $NH_3$ as reductant ($NH_3$—SCR), and a method of preparing this copper-containing zeolite according to the invention as well as towards the use in $NH_3$—SCR catalysis. In particular, the invention provides a copper-containing MOZ-type catalyst, wherein the zeolite contains 0.1 to 12.5 wt. % copper oxide.

A major driver for the recent and future development of catalysts are the increasingly stringent world-wide legislative emission levels for road (e.g. passenger cars, trucks) and non-road (e.g. ships, trains) applications. In the specific case of removing nitrogen oxides from the exhaust gas of lean burn engines, there is a global need for more active, more selective and more stable catalysts, due to tightened legislative emission levels and increased durability needs. One effective method to remove nitrogen oxides ($NO_x$) from the exhaust gas of these lean burn engines is selective catalytic reduction (SCR) with ammonia ($NH_3$). In $NH_3$—SCR, the $NO_x$ molecules are catalytically reduced to $N_2$ using $NH_3$ reducing agent. Ammonia usually is fed as a less hazardous urea solution, which is decomposed to ammonia in the catalytic unit, and can be filled and stored in the vehicle in a dedicated reservoir.

Out of the different candidate catalyst materials, transition metal exchanged zeolites are found to be the best performing $NH_3$-SCR catalysts, especially in passenger cars and light duty vehicles. Zeolites are highly porous crystalline aluminosilicate materials with uniform pores and channels of molecular dimensions which occur in numerous framework structures. They are classified by the Structure Commission of the International Zeolite Association which defines respective framework types. The commission also assigns framework type codes consisting of three capital letters to all unique and confirmed framework topologies. For example, a widely used group of zeolites belongs to the faujasite framework to which the code FAU has been assigned. Zeolites can differ by framework type, as well as by chemical composition, atom distribution, crystal size and morphology. Zeolites play an important role as catalysts in the $NH_3$—SCR reaction, in particular if cations like copper and iron are included in the zeolite pores. They can perform over a broad temperature range in terms of conversion performance and selectivity.

While zeolites occur in nature, zeolites intended for use as SCR catalyst or other industrial applications are usually manufactured via synthetic processes.

It is common to classify zeolites according to their pore size which is defined by the ring size of the biggest pore aperture. Zeolites with a large pore size have a maximum ring size of 12 tetrahedral atoms, zeolites with a medium pore size have a maximum pore size of 10 and zeolites with a small pore size have a maximum pore size of 8 tetrahedral atoms.

The catalytic reduction of $NO_x$ with $NH_3$ can be represented by different reaction equations. Nitric oxide (NO) is the main $NO_x$ compound produced in an engine. The reduction of NO is referred to as the "standard" $NH_3$—SCR reaction:

$$4NO+4NH_3+O_2 \rightarrow 4N_2+6H_2O \quad (1)$$

$NO_2$ is more reactive than NO. In presence of mixtures of NO and $NO_2$, the $NH_3$—SCR reaction is easier, and the so-called "fast" $NH_3$-SCR reaction can occur:

$$2NH_3+NO+NO_2 \rightarrow 2N_2+3H_2O \quad (2)$$

To take profit of the fast $NH_3$—SCR reaction, an additional catalyst is needed to oxidize part of the NO into $NO_2$.

Also, side reactions may occur and result in unwanted products or the unproductive consumption of ammonia:

$$2NH_3+2O_2 \rightarrow N_2O+3H_2O \quad (3)$$

$$4NH_3+3O_2 \rightarrow N_2+6H_2O \quad (4)$$

$$4NH_3+5O_2 \rightarrow 4NO+6H_2O \quad (5)$$

$$2NH_3+2NO_2+H_2O \rightarrow NH_4NO_2+NH_4NO_3 \quad (6)$$

In official driving cycles, exhaust gas temperatures of latest generation engines and hybrid vehicles with reduced fuel consumption and low $CO_2$ emission are significantly lower than with previous engine generations. Therefore, it is necessary to obtain a $NH_3$-SCR catalyst which has a high low-temperature $NO_x$ conversion capacity. In general, Cu-containing zeolites display a better low-temperature $NO_x$ conversion then their Fe-containing counterparts.

Next to selectivity and activity, the hydrothermal stability of SCR catalysts is another essential parameter, as an $NH_3$-SCR catalyst has to withstand harsh temperature conditions under full load of the engine and the exposure to water vapor at temperatures up to 700° C. is known to be critical for many zeolite types.

An MOZ type material contains both small (8-membered rings) and large pores (12-membered rings). Given the definition for zeolites according to their biggest pore aperture as described above, MOZ and its isotype ZSM-10 are large pore size zeolites. It is well known to the skilled person that the synthesis of a specific zeolite generally requires the use of a specific structure-directing agent (SDA) or a derivative thereof. In the case of MOZ and its isotype ZSM-10, N,N'-1,4-dimethyl-1,4-diazoniabicyclo[2.2.2]octane dication, often referred to as "diquat", is a suitable SDA. Diquat is the N,N-dimethyl derivative of 1,4-diazoniabicyclo[2.2.2]octane, which is also known as DABCO. This diquaternary ammonium cation can be synthesized by reacting DABCO with iodomethane. The diquat diiodide obtained can be transferred into the corresponding diquat dihydroxide by ion exchange.

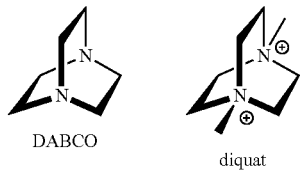

DABCO    diquat

A reproducible, scaleable synthesis of ZSM-10 is disclosed in JB Higgins and Kirk D. Schmitt: "ZSM-10: Synthesis and tetrahedral framework structure", Zeolites 1996, 16, 236-244. A first solution is prepared by mixing aqueous KOH with aluminium powder and stirring for 3.5 h, followed by the addition of an aqueous solution of diquat diiodide. A second aqueous solution comprises KOH and Cabosil. Both solutions are mixed and aged for 4 days at 140° C. After centrifugation, washing and calcining of the product, an $NH_4^+$ exchange is carried out, following by centrifuging, washing and calcining for 3 h at 500° C., the now ammonium-exchanged product again. Higgins and Schmitt describe the tetrahedral framework of the ZSM-10 zeolite as consisting from columns of alternating cancrinite cages and double six-membered rings. It has two different one-dimensional 12-ring pore systems parallel to the c-axis: one channel being topologically identical to the sinusoidal channel on the LTL framework, and the other one being identical to the OFF framework. However, the exact framework type of ZSM-10 was not yet known in 1996.

A method for making ZSM-10 by use of diquat salts was already described in U.S. Pat. No. 3,692,470. Aluminum was dissolved in aqueous KOH solution, and Cab-O-Sil was dissolved in aqueous KOH solution in another vessel. Both solutions were mixed, and diquat was added. The product, i.e. ZSM-10, was filtered off, washed and dried, but not calcined. U.S. Pat. No. 3,692,470 also discloses methods to recover diquat by ion exchange. However, transition metal containing ZSM-10, e.g. the copper containing form, are not described.

JP H02-258617 A also discloses a method for making ZSM-10. An aqueous solution of sodium silicate is reacted with an aqueous solution containing aluminium. Then the amorphous sodium aluminosilicate compound is crystallized in the presence of potassium hydroxide and 1,3-dimethyl-1,4-diazoniabicyclo(2.2.2)octane bromide to yield crystalline ZSM-10.

The similarity of ZSM-10 to LTL was confirmed by Dorset (D Dorset: "The crystal structure of ZSM-10, a powder X-ray and electron diffraction study", Z Kristallogr 2006, 211, 260-265) and by Foster et al. (M D Foster, M M J Treacy, J B Higgins, I Rivin, E Balkovsky, K H Randall: "A systematic topological search for the framework of ZSM-10", J Appl Cryst 2005, 38, 1028-1030), but these two publications also failed to completely elucidate the structure of this zeolite.

In 2007, the International Zeolite Association added the MOZ framework type to the list of zeolite framework types. McCusker et al. reported in 2009 that both LZ-135 and ZSM-10 are related to one another and show similarities to the zeolite framework type LTL, but both belong to two framework types unknown before: LZ-135 belongs to the framework type LTF, whereas ZSM-10 exhibits the framework structure MOZ, see LB McCusker, C Baerlocher, S T Wilson, R W Broach: "Synthesis and Structural Characterization of the Aluminosilicate LZ-135, a Zeolite Related to ZSM-10", J Phys Chem C 2009, 113, 9838-9844.

U.S. Pat. No. 5,714,133 discloses a method for the synthesis of crystalline aluminosilicate zeolites, such as ZSM-10, whose synthesis requires or is improved by one or more periods of gel aging. In the method according to U.S. Pat. No. 5,714,133, the gel aging step is replaced by a continuous increase in temperature to the final crystallization temperature. A first solution of aluminium powder, KOH and diquat and a second solution of Cab-o-sil and KOH are both stirred separately and then mixed. Subsequently, the mixture is heated to 140° C. over two days and then held a further two days at 140° C. After centrifugation, washing and calcining, the resulting zeolite is either ammonium exchanged followed by a barium exchange and impregnation with tetramine platinum(II) chloride or directly treated with tetramine platinum(II) chloride. U.S. Pat. No. 5,714,133 is silent about potential $NO_x$ reduction capacities of the resulting ZSM-10 zeolites, and it does not disclose copper or iron exchanged ZSM-10, either.

WO 2016/003503 A1 discloses crystalline molecular sieves designated SSZ-98, a method of making thereof, and uses for SSZ-98 in organic conversion processes. SSZ-98 has the ERI framework topology type. The molecular sieve, i.e. SSZ-98, is prepared by preparing a reaction mixture containing at least one source of silicon oxide, at least one source of aluminium oxide, one or more sources of one or more elements selected from Groups 1 and 2 of the Periodic Table, hydroxide ions, and a diquat dication. The diquat dication is associated with an anion such as fluoride, chloride, bromide, iodide, hydroxide, acetate, sulfate, tetrafluoroborate, carboxylate, and the like. This reaction mixture, which is a gel, is then subjected to crystallization conditions sufficient to form crystals of the molecular sieve. It has to be noted that SSZ-98 having a gel silica to alumina ratio (SAR) of smaller than 16.7 only forms in the presence of an additional organic template, namely 18-crown-6.

WO 2016/070090 A1 describes compositions and catalytic articles comprising both a first molecular sieve promoted with copper and a second molecular sieve promoted with iron, the first and second molecular sieves having a d6r unit and the first molecular sieves having cubic shaped crystals with an average crystal size of about 0.5 to about 2 microns. The weight ratio of the copper-promoted molecular sieve to the iron-promoted molecular sieve can be about 1:1 to about 4:1. The catalytic articles are useful to catalyze the reduction of nitrogen oxides in the presence of a reductant. WO 2016/070090 A1 suggests the use of several zeolites, among them MOZ. However, all the examples presented in this application refer to CHA with copper or iron and various crystals sizes. The results of the SCR efficiency and selectivity tests show that a mixture of Cu-CHA and Fe-CHA is superior to pure Cu-CHA or pure Fe-CHA, respectively, and that the crystal size is also crucial.

US 2008/0127634 A1 discloses a method for reducing nitrogen oxides including NO and $NO_2$ in an exhaust stream also comprising oxygen, carbon monoxide and hydrocarbons at a temperature above about 150° C., wherein the method comprises oxidizing NO in the exhaust stream to $NO_2$, adding diesel fuel hydrocarbons and their oxygenates to the exhaust stream for the reduction of nitrogen oxides, and contacting the exhaust stream with a hybrid reduction catalyst comprising an alkali metal or an alkaline earth metal, a zeolite, a transition metal, and a metal oxide to the reduce the nitrogen oxides to $N_2$. The hybrid $NO_x$ reduction catalyst is prepared by mixing an alkali metal or alkaline earth metal supported on a zeolite and a transition metal supported on a metal oxide through an aqueous ion exchange and wet impregnation to form a homogeneous physical mixture which is then compressed to form a wafer and subsequently annealed. The zeolite may be a medium or large pore zeolite, and ZSM-10 is described as one of the suitable large pore zeolites. All alkali and alkaline earth metals can be supported on said zeolite. The transition metal is selected from silver, copper, cobalt, nickel, iron, manganese, chromium, molybdenum and vanadium, and the metal oxide is selected from $Al_2O_3$, $SiO_2$, $TiO_2$, $SnO_2$ and MgO. However, US 2008/0127634 A1 is silent about the amount of zeolite, alkali or alkaline earth metal, transition metal, and metal oxide. Furthermore, it deals with a physical mixture of alkali or alkaline earth metal zeolites on the one hand and transition metals supported on a metal oxide on the other hand. There is no hint to a zeolite comprising both an alkali or alkaline earth metal and a transition metal or to a method for making such a zeolite.

WO 2015/195809 A1 discloses a selective catalytic reduction (SCR) material comprising a spherical particle including an agglomeration of crystals of a molecular sieve, wherein the spherical particle has a median particle size in a range of about 0.5 to about 5 microns. The molecular sieve is selected from several zeolites, among them MOZ. Furthermore, the molecular sieve can be promoted with a metal selected from copper, iron, cobalt, nickel, lanthanum, cerium, manganese, vanadium and silver, and it may also comprise sodium. However, the embodiments presented in WO 2015/195809 A1 do not disclose MOZ, and this document does also not provide methods for making a copper-containing MOZ.

Problem to be Solved by the Invention

It is therefore an object of the present invention to provide novel catalyst compositions which overcome the disadvantages of the prior art and show improved selectivity, activity and hydrothermal stability, and a process for making said novel catalyst compositions.

Solution of the Problem

The inventors of the present invention have now surprisingly found crystalline aluminosilicate zeolites comprising a MOZ framework type material, wherein the MOZ framework type material contains 0.1 to 12.5 wt.-% copper, calculated as CuO and based on the total weight of the respective zeolite. They are excellent $NH_3$—SCR catalysts in terms of activity, $N_2$ selectivity and hydrothermal stability, and they show a very good low-temperature activity while maintaining a high activity in a broad temperature range, even after hydrothermal aging. A low $N_2O$ formation is typical for MOZ-type zeolites according to the invention.

The novel crystalline aluminosilicate MOZ-type zeolites according to the present invention and the process for making them are explained below, with the invention encompassing all the embodiments indicated below, both individually and in combination with one another.

A crystal structure is a description of the ordered arrangement of atoms, ions, or molecules in a crystalline material. Ordered structures occur from the intrinsic nature of the constituent particles to form symmetric patterns that repeat along the principal directions of three-dimensional space in matter. A "crystal" therefore represents a solid material whose constituents are arranged in a crystal structure.

A "crystalline substance" is composed of crystals.

A "zeolite framework type", also referred to as "framework type", represents the corner-sharing network of tetrahedrally coordinated atoms.

A "MOZ framework type material" is a zeolitic material having a MOZ framework type.

The crystalline aluminosilicate zeolites according to the present invention which comprise a MOZ framework type material and wherein the MOZ framework type material contains 0.1 to 12.5 wt.-% copper are hereinafter referred to as "the zeolites" or "the zeolites according to the present invention".

In one embodiment of the present invention, the MOZ framework type material is ZSM-10.

In one embodiment of the present invention, the silica to alumina molar ratio of the zeolites ranges from 5 to 30, preferably 6 to 16 and even more preferably, the silica to alumina ratio ranges from 7 to 9. Hereinafter, the silica to alumina molar ratio is abbreviated as SAR.

The zeolites according to the present invention comprise copper in an amount of 0.1 to 12.5 wt.-%, preferably 0.1 to 10 wt.-%, even more preferably 1.5 to 6 wt.-%, and most preferably 3 to 5 wt.-%, calculated as CuO and based on the total weight of the respective zeolite.

In one embodiment of the present invention, the copper to aluminium atomic ratio of the zeolites is in the range of between 0.003 to 0.5.

In one embodiment of the present invention, the zeolites comprise cations of at least one alkali or alkaline earth metal selected from lithium, sodium, potassium, rubidium, cesium, ammonium, magnesium, calcium, strontium and barium in an amount of 0.3 to 5 wt.-%, calculated as pure metals and based on the total weight of the zeolites. It is well known to the skilled person that the ammonium cation $NH_4^+$ has very similar properties to heavier alkali metal cations. Therefore, the ammonium cation $NH_4^+$ is considered an alkali cation in the present invention, which is in accordance with common practice. In a preferred embodiment, the zeolites comprise potassium cations or a mixture of sodium and potassium cations. More preferably, the zeolites comprise potassium cations.

The cations of at least one alkali or alkaline earth metal are present in an amount of 0.3 to 9 wt.-%, preferably 0.3 to 5.0 wt.-%, and even more preferably 0.5 to 3.0 wt.-%, calculated as pure metals and based on the total weight of the zeolites. In case of ammonium cations, their content is calculated from results of combustion analysis which is well known to the skilled person.

In one embodiment of the present invention, the crystallite size of the zeolites according to the invention is between 10 nm to 5000 nm, preferably 20 nm to 2000 nm, even more preferably between 50 nm and 1000 nm, and most preferably between 50 nm and 500 nm.

The object to provide a process for making the crystalline aluminosilicate zeolites according to the present invention comprises the following steps:
   a) preparing a first aqueous reaction mixture comprising a silica source and potassium hydroxide,
   b) preparing a second aqueous reaction mixture comprising
      potassium hydroxide,
      an aluminium source,
      a structure-directing agent selected from N,N'-1,4-dimethyl-1,4-diazoniabicyclo-[2.2.2]octane difluoride, N,N'-1,4-dimethyl-1,4-diazoniabicyclo-[2.2.2]octane dichloride, N,N'-1,4-dimethyl-1,4-diazoniabicyclo-[2.2.2]octane dibromide, N,N'-1,4-dimethyl-1,4-diazoniabicyclo-[2.2.2]octane diiodide, N,N'-1,4-dimethyl-1,4-diazoniabicyclo-[2.2.2]octane dihydroxide and mixtures thereof,
   c) combining the two aqueous reaction mixtures,
   d) aging the reaction mixture obtained in step c),
   e) heating the mixture,
   f) recovering, washing and drying the zeolite obtained in step e),
   g) calcining the zeolite,
   h) introducing of Cu,
   i) washing and drying the copper containing zeolite obtained in step h).

The potassium hydroxide in step a) is used in the form of 0.5 to 2.5 M aqueous potassium hydroxide solutions. More preferably, a 1 to 2.5 M aqueous potassium hydroxide solution is used.

Suitable silica sources to be used in step a) of the process according to the present invention are commercially available stabilized silica sols and fumed silicas. A suitable commercially available silica source is, for instance, Cab-O-Sil M5. Furthermore, alkoxysilanes such as tetraethoxysilane (TEOS) and tetramethoxysilane (TMOS) can be used as silica sources. Preferably, the silica source is Cab-O-Sil M5.

In one embodiment, the silica source is added to the aqueous alkali or alkaline earth metal hydroxide solution within 5 to 25 min. After complete addition of the silica source, the mixture is stirred for 3 to 4 hours at room temperature.

Optionally, the reaction mixture in step a) may additionally comprise cations chosen from the group consisting of lithium, sodium, rubidium, cesium, ammonium, magnesium, calcium, strontium and barium and mixtures thereof. These cations may, for instance, be present in the form of the respective hydroxides or as a component of the silica source. Preferably, the additional cation is sodium or ammonium, most preferably, it is sodium.

The details made above for potassium hydroxide to be used in step a) of the inventive process apply equally to step b). Furthermore, the reaction mixture in step b) may additionally comprise cations chosen from the group consisting of lithium, sodium, rubidium, cesium, ammonium, magnesium, calcium, strontium and barium and mixtures thereof, as mentioned above for the mixture of step a). As is the case with step a) these additional cations may be present in the form of their hydroxides, or they may be a component of the alumina source. Preferred additional cations are sodium and ammonium, and even more preferred, the additional cation is sodium.

The alumina source used in step b) is selected from aluminium powder, aluminium-trisec-butoxide Al[O(CH)(CH$_3$)C$_2$H$_5$]$_3$, aluminiumnitrate, aluminiumsulfate, sodium aluminate and aluminium hydroxide. Preferably, the alumina source is aluminium powder. In one embodiment, the aluminium source is added within 5 to 25 minutes to the aqueous alkali or alkaline earth metal hydroxide solution. In a preferred embodiment, the second aqueous reaction mixture comprises 1.5 to 5 wt.-% of aluminium, calculated as pure aluminium metal per weight of the potassium hydroxide solution. After complete addition of the aluminium source, the mixture is stirred for 3 to 4 hours at room temperature. Afterwards, a structure-directing agent is added to the mixture. The structure-directing agent is chosen from N,N'-1,4-dimethyl-1,4-diazoniabicyclo-[2.2.2]octane difluoride, N,N'-1,4-dimethyl-1,4-diazoniabicyclo-[2.2.2]octane dichloride, N,N'-1,4-dimethyl-1,4-diazoniabicyclo-[2.2.2]octane dibromide, N,N'-1,4-dimethyl-1,4-diazoniabicyclo-[2.2.2]octane diiodide, N,N'-1,4-dimethyl-1,4-diazoniabicyclo-[2.2.2]octane dihydroxide, shown below as formula 1, wherein X— represents a fluoride, chloride, bromide, iodide or hydroxide anion, and mixtures thereof.

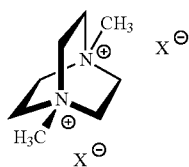

1

Hereinafter, the structure-directing agents according to formula 1 are referred to as "the diquat salts".

In one embodiment, the structure-directing agent is selected from N,N'-1,4-dimethyl-1,4-diazoniabicyclo-[2.2.2]octane diiodide, N,N'-1,4-dimethyl-1,4-diazoniabicyclo-[2.2.2]octane dihydroxide and mixtures thereof.

In one embodiment, the structure-directing agent is used in a concentration of 0.3 to 0.6 mole per mole of the aluminium source.

In yet another embodiment, 1,4-diazoniabicyclo[2.2.2] octane (DABCO) is added to the mixture together with the structure-directing agent.

In one embodiment, the amounts of the silica and the aluminium source in steps a) and b) of the process according to the present invention are chosen in a way that the SAR ranges between 10 and 80 in the synthesis. It is well known to the skilled person that the SAR ranges used in the synthesis and the SAR ranges obtained in the final zeolite are not identical. In the process according to the present invention, SAR ranges between 10 and 80 in the synthesis gel yield zeolites with SAR ranges between 5 to 30. The skilled person knows how to adjust the SAR in the synthesis in order to obtain a desired SAR in the final zeolite.

In step c) of the process according to the present invention, the two aqueous reaction mixtures obtained in steps a) and b) can be mixed in any order. However, it is preferred to add the reaction mixture which comprises the alumina source and the structure-directing agent to the silica source.

Preferably, the alkali or alkaline earth metal hydroxide in steps a) and b) are used in the form of 0.5 to 2.5 M aqueous solutions and the structure-directing agent in step b) is used in the form of 0.4 to 0.75 M aqueous solutions. Preferably, the two aqueous reaction mixtures are stirred for 15 to 60 min at room temperature after combining them in step c) until a homogeneous mixture is obtained.

In step d) of the process according to the present invention, the reaction mixture obtained in step c) is aged at room temperature for 1 to 5 days, preferably for 1 day.

The heating step e) is carried out at temperatures between 85° C. and 140° C. for 4 to 95 days under autogenous pressure. In one embodiment, the heating step is carried out at 110° C. for 13 days. In another embodiment, the heating step is carried out at 88° C. for 94 days. The skilled person knows that it is reasonable to combine higher temperatures with shorter reaction times and vice versa. He can make use of this knowledge without leaving the scope of protection of the claims. A slow heating of the synthesis gel up to the final temperature is advantageous, which means that the heating rate is between 0.1° C. and 1° C./min up to the final temperature of 85° C. to 140° C. After reaching said final temperature, it is kept constant for the above mentioned time, i.e. for 4 to 95 days. In a preferred embodiment, heating up and keeping the temperature are carried out under dynamic conditions. In the present invention, a reaction step carried out under "dynamic conditions" means that the reaction mixture is moved while the respective step is being carried out. Means of moving a reaction mixture are, for instance, stirring said mixture or tumbling the reaction vessel.

The solid product obtained by this heating step is then recovered and washed with deionized water, and then dried at 50 to 80° C., preferably 65° C., for 8 to 16 h.

The zeolite obtained from step f) is then calcined according to step g) of the process according to the present invention. It is advantageous to carry out the calcination at a temperature of 500 to 600° C., preferably 540 to 560° C. Preferably, the oven is heated slowly, for instance at 0.5 to 2° C./min. After the final calcination temperature of 540 to 560° C. is reached, it is held for 6 to 10 hours. Afterwards, the heating is switched off, and the zeolite is allowed to cool down to room temperature.

In step h) of the process according to the present invention, copper is introduced via ion exchange. In a first step, an ammonium exchange is performed in order to remove part of the alkali or alkaline earth metal cations from the zeolite framework by replacing them with NH$_4^+$ cations. In a second step, $NH_4^+$ is replaced by copper cations. The copper content of the resulting copper-containing small-pore MOZ-type zeolite can be easily controlled via the amount of copper salt and the number of ion exchange procedures performed.

Methods for introducing ammonium and copper cations, respectively, are well known to the skilled artisan. They can be applied to the MOZ-type zeolites which are obtained following the process of the present invention without departing from the scope of the claims. For example, ammonium cations can be easily introduced via liquid ion exchange, and copper cations can also easily be introduced via liquid ion exchange, incipient wetness impregnation or solid state ion exchange.

Said methods are presented exemplarily hereinafter.

Liquid Ion Exchange

An $NH_4^+$ liquid ion exchange can be performed at 100° C. in an aqueous suspension under reflux conditions. 100 ml of a 0.5 M aqueous $NH_4Cl$ or $NH_4NO_3$ solution is used per 1 g of the zeolite.

A $Cu^{2+}$ liquid ion exchange is performed at room temperature for 20 h. 100 ml of an aqueous copper acetate $(Cu(Ac)_2)$, copper nitrate $(Cu(NO_3)_2)$ or copper chloride $(CuCl_2)$ solution per 1 g zeolite is used, corresponding to 0.03 g Cu per 1 g zeolite. This procedure can be repeated multiple times in order to achieve the desired copper content.

It is obvious for the skilled person that the copper to zeolite ratio in liquid ion exchange can be adjusted according to the desired copper content of the final zeolite. Generally spoken, aqueous solutions with higher copper contents yield higher copper-containing zeolites. The skilled person may, for instance, choose aqueous copper salt solutions having a copper content of 0.03 to 0.1 g copper per 1 g zeolite in order to yield the copper-containing MOZ-type zeolites according to the present invention, said Cu-containing MOZ-type zeolites having a Cu content of from 0.1 to 12.5-wt. %, calculated as CuO and based on the total weight of the zeolite. Which copper concentration per 1 g zeolite should be chosen and how often the procedure shall be repeated can easily be determined by the skilled person without departing from the scope of the claims.

Incipient Wetness Impregnation

An aqueous solution of copper acetate $(Cu(Ac)_2)$, copper nitrate $(Cu(NO_3)_2)$ or copper chloride $(CuCl_2)$ is used in a volume equal to the zeolite pore volume. The amount of copper acetate, chloride or nitrate is equal to the amount of copper preferred in the zeolite. The incipient wetness impregnation is carried out at room temperature. Afterwards, the copper-exchanged zeolite is dried at temperatures between 60 and 70° C. for 8 to 16 hours, and the mixture is subsequently heated to temperatures in the range of 550 to 900° C.

Solid State Ion Exchange

Suitable copper salts are, for instance, copper acetate $(Cu(Ac)_2)$, copper nitrate $(Cu(NO_3)_2)$, copper chloride $(CuCl_2)$, copper oxide $(CuO)$ and copper acetylacetonate $(Cu(acac)_2)$. The copper salt and the zeolite are mixed in a dry state, and the mixture is subsequently heated to temperatures in the range of 550 to 900° C.

Analogously, alkali or alkaline earth metals can be exchanged against one another. In the process according to the present invention, KOH is used for the preparation of the first and the second reaction mixture according to steps a) and b). The potassium contained in the zeolite thus obtained can be reduced by treatment with aqueous ammonium chloride solutions. The calcined zeolite is mixed with an aqueous $NH_4Cl$ solution and heated up to the boiling point. The zeolite is recovered by filtration and washing with deionized water and then dried. Repeating this procedure for one or more times further reduces the content of potassium cations. It is also possible to perform an $NH_4^+$ wet ion exchange as described above, followed by a liquid ion exchange with other alkali or alkaline earth metal cations. Suitable alkali or alkaline earth metal salts which can be used in such a liquid ion exchange are well known to the skilled person. They comprise, for instance, the chlorides, nitrates and sulfates of lithium, sodium, potassium, rubidium, cesium, magnesium, calcium, strontium and barium, depending on the cations that are present after step g) of the process according to the present invention on the one hand and the cations that shall be introduced into the final zeolite at the other hand. It is also possible to combine exchange steps for introducing alkali or alkaline earth metals cations and copper cations. If both copper cations and alkali or alkaline earth metal cations shall be introduced, it is possible 1. to introduce the alkali or alkaline earth metal cations first, followed by the introduction of copper cations,
2. to introduce the copper cations first, followed by the introduction of alkali or alkaline earth metal cations, or
3. to introduce alkali or alkaline earth metal cations and copper cations concomitantly.

Which one of the three options to introduce both alkali and alkaline earth metal cations and copper will be chosen depends on where these cations shall be placed within the zeolite and which use of the zeolite thus obtained is intended. The skilled person knows how to find the most suitable of these three options by routine experiments. He can make use of this knowledge without leaving the scope of protection of the claims.

In one embodiment of the present invention, an $NH_4^+$ liquid ion exchange is performed first, followed by a $Cu^{2+}$ liquid ion exchange, incipient wetness impregnation or solid state exchange of Cu.

The copper containing MOZ-type zeolites according to the present invention can be used for the preparation of SCR catalysts. Furthermore, they are suitable ion exchangers. They can also be used as molecular sieves and as catalysts in a large variety of reactions. Well-known uses of zeolites include, for instance, fluid catalytic cracking, hydrocracking, hydrocarbon conversion reactions, reprocessing methods and heat accumulation.

Exhaust emissions of vehicles driven by a predominantly lean combustion engine contain, next to particle emission, in particular the primary emissions carbon monoxide CO, hydrocarbons HC, and nitrogen oxides NON. Due to the relatively high oxygen content of up to 15 vol. %, carbon monoxide and hydrocarbons can be rendered harmless by oxidation fairly easy, but the reduction of the nitrogen oxides to nitrogen is much more difficult to achieve.

An SCR catalyst containing a Cu-containing MOZ framework type material according to the present invention may be manufactured by well-known methods.

The SCR catalysts may, for instance, be obtained by solid state sublimation. For this purpose, a dry, intimate mixture of the zeolite and a copper salt as described above under "solid state ion exchange" is made. Said mixture is then heated to a temperature of 550 to 900° C., whereby the copper salt decomposes into the metal (i.e. copper) or the copper ion. Subsequently, the mixture is heated at a temperature and for a time span sufficient to achieve the solid state sublimation of copper into the MOZ framework type material.

The powder thus obtained is then dispersed in water and mixed with a binder. Suitable binders are, for example, boehmite and silica gel. Afterwards, this mixture comprising water, a binder, and the copper-containing MOZ framework type material only needs to be stirred or homogenized, respectively, and may be applied directly as a coating suspension to coat a carrier substrate. The coating suspension is hereinafter referred to as the "washcoat".

In an alternative embodiment, the SCR catalysts according to the present invention may be manufactured by suspending the MOZ framework type material in its sodium, potassium or ammonium form in water, followed by adding a water-soluble copper salt as described above under "liquid ion exchange". A particularly suitable copper salt is copper acetate. After this liquid ion exchange, the Cu containing MOZ framework type material thus obtained is then dispersed in water and mixed with a binder to form a washcoat as described above.

In some embodiments of the SCR catalysts according to the present invention, said SCR catalyst is present in the form of a coating on a carrier substrate. Carrier substrates can be so-called flow-through substrates or wall-flow filters, respectively.

Both carrier substrate may consist of inert materials, such as silicium carbide, aluminium titanate, cordierite or metal. Such carrier substrates are well-known to the skilled person and available on the market.

In other embodiments, the carrier substrates may be catalytically active on their own, and they may comprise catalytically active material, e.g. SCR-catalytically active material. SCR-catalytically active materials which are suitable for this purpose are basically all materials known to the skilled person, for example catalytically active materials based on mixed oxides, or catalytically active materials based on copper-exchanged, zeolitic compounds. Mixed oxides comprising compounds of vanadium, titanium and tungsten are particularly suitable for this purpose.

In addition to the catalytically active material, these carrier substrates comprise a matrix component. All inert materials which are otherwise used for the manufacturing of catalyst substrates may be used as matrix components in this context. It deals, for instance, with silicates, oxides, nitrides or carbides, with magnesium aluminium silicates being particularly preferred.

In other embodiments of the SCR catalysts according to the present invention, the catalyst itself forms part of the carrier substrate, for example as part of a flow-through substrate or a wall-flow filter. Such carrier substrates additionally comprise the matrix components described above.

Carrier substrates comprising the SCR catalysts according to the present invention may be used as such in exhaust purification. Alternatively, they may be coated with catalytically active materials, for example with SCR-catalytically active materials. Insofar as these materials shall exhibit an SCR catalytic activity, the SCR catalysts mentioned above are suitable materials.

In one embodiment, catalytically active carrier materials are manufactured by mixing 10 to 95 wt.-% of an inert matrix component and 5 to 90 wt.-% of a catalytically active material, followed by extruding the mixture according to well-known protocols. As already described above, inert materials that are usually used for the manufacture of catalyst substrates may be used as the matrix components in this embodiment. Suitable inert matrix materials are, for example, silicates, oxides, nitrides and carbides, with magnesium aluminium silicates being particularly preferred.

The application of the catalytically active catalyst onto either the inert carrier substrate or onto a carrier substrate which is catalytically active on its own as well as the application of a catalytically active coating onto a carrier substrate, said carrier substrate comprising a catalyst according to the present invention, can be carried out following manufacturing processes well known to the person skilled in the art, for instance by widely used dip coating, pump coating and suction coating, followed by subsequent thermal post-treatment (calcination).

The skilled person knows that in the case of wall-flow filters, their average pore sizes and the mean particle size of the catalysts according to the present invention may be adjusted to one another in a manner that the coating thus obtained is located onto the porous walls which form the channels of the wall-flow filter (on-wall coating). However, the average pore sizes and the mean particle sizes are preferably adjusted to one another in a manner that the catalyst according to the present invention is located within the porous walls which form the channels of the wall-flow filter. In this preferable embodiment, the inner surfaces of the pores are coated (in-wall coating). In this case, the mean particle size of the catalysts according to the present invention has to be sufficiently small to be able to penetrate the pores of the wall-flow filter.

The catalysts according to the present invention may advantageously be used for the exhaust purification of lean combustion engines, in particular for diesel engines. They convert nitrogen oxides comprised in the exhaust gas into the harmless compounds nitrogen and water.

Commonly known exhaust gas purification systems are often formed by arranging an oxidation catalyst (DOC) having an oxidative function for nitrogen monoxide and hydrocarbon and aforementioned selective catalytic reduction type catalyst (SCR) having an oxidative function layer in the subsequent stage thereof, in a flow path of exhaust gas, characterized in that a spraying means to supply an urea aqueous solution or an aqueous ammonia solution is arranged in the downstream of the aforementioned oxidation catalyst and in the upstream of aforementioned selective catalytic reduction type catalyst. Furthermore, a diesel particulate filter (DPF) for filtering out soot is often combined with the DOC and the SCR. In these arrangements, combustible particle components are deposited on the DPF and combusted therein. Such arrangements are, for instance, disclosed in EP 1 992 409 A1. Widely used arrangements of such catalysts are, for example (from upstream to downstream):

$$DOC+(NH_3)+SCR \qquad (1)$$

$$DOC+DPF+(NH_3)+SCR \qquad (2)$$

$$DOC+(NH_3)+SCR+DPF \qquad (3)$$

$$DOC+(NH_3)+SCR+DOC+DPF. \qquad (4)$$

In the above examples (1) to (4), $(NH_3)$ represents a position where an urea aqueous solution, an aqueous ammonia solution, ammonium carbamate, ammonium formiate or the like is supplied as a reducing agent by spraying. The supply of such urea or ammonia compounds in automotive exhaust gas purification systems is well known in the art.

Hence, the present invention furthermore refers to a method for the purification of exhaust gases of lean combustion engines, characterized in that the exhaust gas is passed over a catalyst according to the present invention.

In a preferred embodiment of the process according to the present invention, ammonia is used as the reducing agent. The ammonia required may, for instance, be formed within the exhaust purification system upstream to a particulate filter by means of an upstream nitrogen oxide storage catalyst ("lean NOx trap"—LNT). This method is known as "passive SCR".

Alternatively, ammonia may be supplied in an appropriate form, for instance in the form of urea, ammonium carbamate or ammonium formiate, and added to the exhaust gas stream as needed. A widespread method is to carry along an aqueous urea solution and to and to dose it into the catalyst according to the present invention via an upstream injector as required.

The present invention thus also refers to a system for the purification of exhaust gases emitted from lean combustion engines, characterized in that it comprises a catalyst according to the present invention, preferably in the form of a coating on a carrier substrate or as a component of a carrier substrate, and an injector for aqueous urea solutions, wherein the injector is located upstream of the catalyst of the present invention.

For example, it is known from SAE-2001-01-3625 that the SCR reaction with ammonia proceeds more rapidly if the nitrogen oxides are present in a 1:1 mixture of nitrogen monoxide and nitrogen dioxide, or if the ratios of both nitrogen oxides are close to 1:1. As the exhaust gas from lean combustion engines generally exhibits an excess of nitrogen monoxide over nitrogen dioxide, this SAE paper suggest to increase the amount of nitrogen dioxide by means of an oxidation catalyst. The exhaust gas purification process according to the present invention may not only be applied in the standard SCR reaction, i.e. in the absence of nitrogen oxide, but also in the rapid SCR reaction, i.e. when part of the nitrogen monoxide has been oxidized to nitrogen dioxide, thus ideally providing a 1:1 mixture of nitrogen monoxide and nitrogen dioxide.

The present invention therefore also relates to a system for the purification of exhaust gases from lean combustion engines, characterized in that it comprises an oxidation catalyst, an injector for aqueous urea solutions and a catalyst according to the present invention, preferably in the form of a coating on a carrier substrate or as a component of a carrier substrate.

In a preferred embodiment of the exhaust gas purification system according to the present invention, platinum supported on a carrier support material is used as an oxidation catalyst.

Any carrier material for platinum which is known to the skilled person as suitable material may be used without departing from the scope of the claims. Said materials show a BET surface area of 30 to 250 m²/g, preferably 100 to 200 m²/g (measured according to DIN 66132). Preferred carrier substrate materials are alumina, silica, magnesium dioxide, titania, zirconia, ceria and mixtures and mixed oxides comprising at least two of these oxides. Particularly preferred materials are alumina and alumina/silica mixed oxides. If alumina is used, it is preferably stabilized, for instance with lanthanum oxide.

The exhaust gas purification system is arranged in an order wherein, in flow direction of the exhaust gas purification system, an oxidation catalyst is arranged first, followed by an injector for an aqueous urea solution, and finally a catalyst according to the present invention.

EMBODIMENTS

Figure 1:
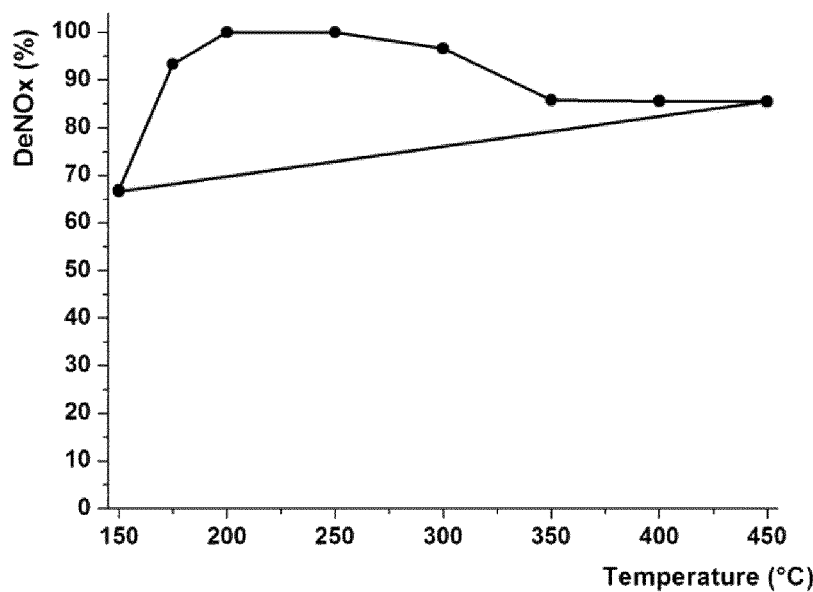
FIG. 1 shows the graphical representation of the NO$_x$ conversion test performed in Embodiment 6.

Synthesis of N,N'-1,4-Dimethyl-1,4-diazoniabicyclo-[2.2.2]octane diiode 9.3 mL (0.15 mol) of iodomethane (Sigma-Aldrich) was added dropwise under reflux conditions to a solution containing 8.415 g (0.075 mol) 1,4-Diazabicyclo[2.2.2]octane (DABCO, Sigma-Aldrich), 300 mL of ethanol and 37.5 mL of H$_2$O. The mixture was left to react under reflux conditions for 2 hours, and then allowed to cool for slow crystallization. This process was improved by further cooling the mixture at lower temperatures (4° C.). The crystals were recovered by filtration and washed with 30 mL of ethanol. The N,N'-1,4-dimethyl-1,4-diazoniabicyclo-[2.2.2]octane diiode thus obtained is hereinafter referred to as diquat diiodide.

Ion exchange of N,N'-1,4-Dimethyl-1,4-diazoniabicyclo-[2.2.2]octane diiode

The 1,4-Dimethyl-1,4-diazoniabicyclo-[2.2.2]octane diiode obtained above was ion-exchanged in batch to the hydroxide form with Amberlite IRA 402 resin (Alfa Aesar). The 1,4-Dimethyl-1,4-diazoniabicyclo-[2.2.2]octane dihydroxide is hereinafter referred to as diquat dihydroxide.

Embodiment 1

A first solution was prepared by dissolving 7 g KOH solution (50 wt % KOH) in 47 g of H$_2$O. 9.2 g SiO$_2$ (Hi-sil 233, PPG) was added to the solution, that was stirred until it was clear.

A second solution was prepared by dissolving 3.3 g of diquat diiodide in 25.6 g H$_2$O. To this solution, 7.2 g of a solution (97 g/L Al, 284 g/L K) of boehmite (PLURAL SB-1 UHPA) in KOH was added.

Solution 2 was slowly added to solution 1, and stirred for 30 minutes. The gel composition was: 14.7 SiO$_2$: 1 Al$_2$O$_3$: 10.3 KOH: 0.85 diquat diiodide: 450 H$_2$O.

The gel was aged for 3 days at room temperature. Next the gel was transferred into a Teflon liner and autoclave and heated to 150° C. in 48 hours with end-over-end rotation, and kept at 150° C. for 5 days.

The obtained zeolite was recovered and washed by centrifugation and dried at 65° C. overnight.

The as prepared zeolite had a molar composition of SiO$_2$:Al$_2$O$_3$:K$_2$O:Na$_2$O of 7.20:1:0.8:0.02.

Embodiment 2

A first solution is prepared by mixing 4.93 g of KOH and 48.4 mL of H$_2$O. To this solution, 8.8 g of Cab-O-Sil M5 is added slowly and the mixture was stirred for 3.5 hours in a closed bottle.

A second solution is made by mixing 1.98 g KOH and 15.4 mL of H$_2$O. To this solution, 0.54 g of aluminium powder is added slowly and the mixture was stirred for 3.5 hours. Afterwards 3.35 g diquat diiodide was dissolved in 17 g H$_2$O, and then added to the aluminium suspension. This mixture was stirred for 30 minutes.

The aluminium/diquat diiodide suspension is added slowly to the first solution and stirred for 30 minutes until a homogeneous mixture is obtained. This mixture is then aged for 3 days at room temperature. The final molar oxide ratio from the synthesis gel is 14.7 $SiO_2:Al_2O_3$:0.85 diquat diiodide:12.3 KOH:448 $H_2O$. Afterwards the mixture is transferred to a stainless steel autoclave and heated at 110° C. for 13 days with a temperature ramp of 1° C./min under static conditions. The obtained zeolite was recovered and washed by centrifugation and dried at 65° C. overnight. The as prepared zeolite was calcined at 550° C. for 8 hours with a temperature ramp of 1° C./min.

Afterwards, the calcined zeolite was subjected to an ammonium and copper exchange as described above. The final zeolite had a molar composition of $SiO_2:Al_2O_3:K_2O$:CuO of 7.28:1:0.26:0.28.

Embodiment 3

A first solution is prepared by mixing 2 g of KOH and 24 mL of $H_2O$. To this solution, 4.6 g of Cab-O-Sil M5 is added slowly and the mixture was stirred for 3.5 hours in a closed bottle.

A second solution is made by mixing 1 g KOH and 8 mL of $H_2O$. To this solution, 0.27 g of aluminium powder is added slowly and the mixture was stirred for 3.5 hours. Afterwards, 8.7 mL diquat dihydroxide (1.2 N) was added to the aluminium suspension. This mixture was stirred for 30 minutes.

The aluminium/diquat dihydroxide suspension is added slowly to the first solution and stirred for 30 minutes until a homogeneous mixture is obtained. This mixture is then aged for 3 days at room temperature. The final molar oxide ratio from the synthesis gel is 15.3 $SiO_2:Al_2O_3$: 1.03 diquat dihydroxide:10.7 KOH:450 $H_2O$. Afterwards the mixture is transferred to a stainless steel autoclave and heated at 88° C. for 94 days under dynamic conditions. The obtained zeolite was recovered and washed by centrifugation and dried at 65° C. overnight. The as prepared zeolite was calcined at 550° C. for 8 hours with a temperature ramp of 1° C./min.

Afterwards, the calcined zeolite was subjected to an ammonium and copper exchange as described above. The final zeolite had a molar composition of $SiO_2:Al_2O_3:K_2O$:CuO of 7.69:1:0.26:0.30.

Scanning Electron Microscopy (SEM) images were recorded on a Nova NanoSEM450 (FEI). Samples were prepared by dispersing the zeolite powders on carbon sticker and measured without conductive coating. Samples were imaged at low landing voltage of 1.00 kV using a circular backscattered detector.

Figure 3A:
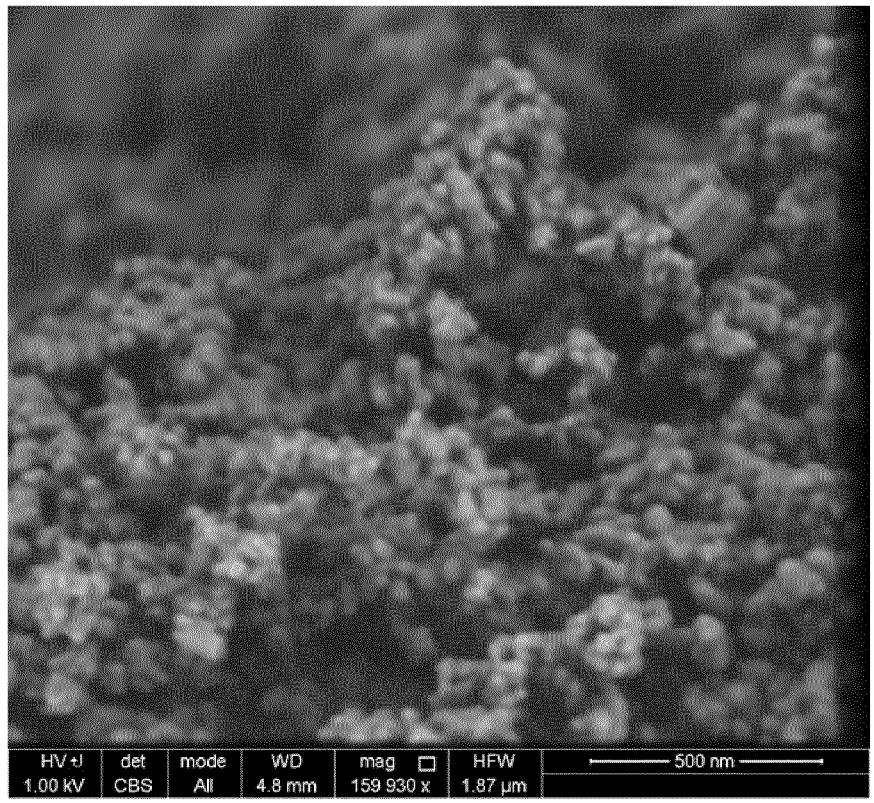
FIG. 3a shows the SEM image of embodiment 3 at a HFW of 1.87 μm and a magnification of 159,930×.
Figure 3B:
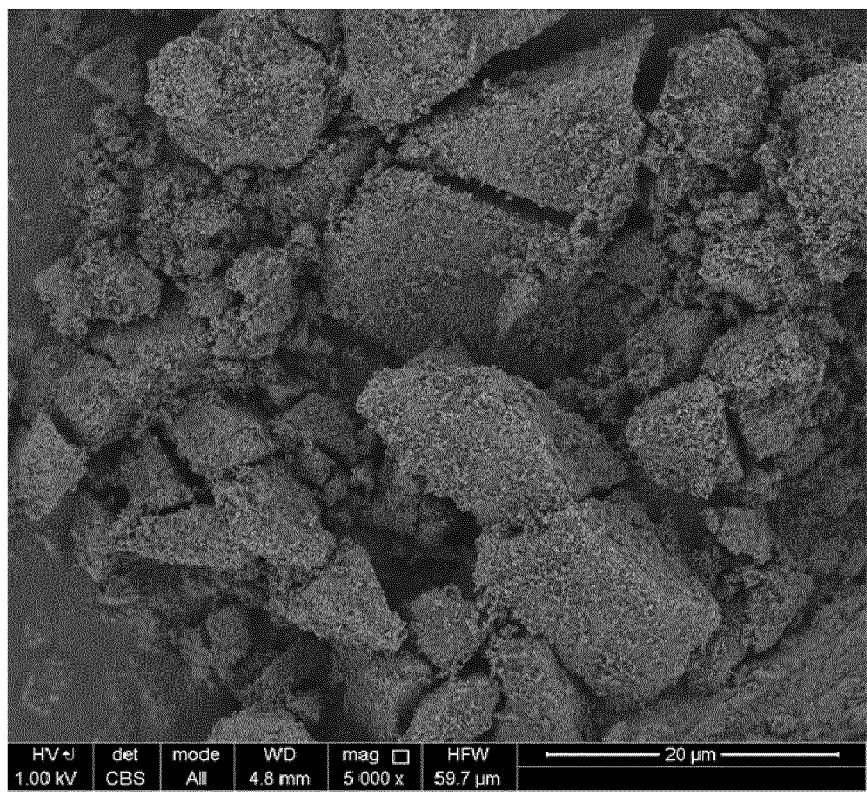
FIG. 3b shows the SEM image of embodiment 3 at a HFW of 59.7 μm and a magnification of 5,000×.

Two SEM images were recorded. The first one was recorded at an HFM (horizontal field width) of 1.87 μm and a magnification of 159,930×. The second one was recorded at an HFM of 59.7 μm and a magnification of 5,000×. The first SEM image is shown in FIG. 3a and the second one in FIG. 3b.

SEM revealed the material to be micrometer sized aggregates composed of nanocrystallites of ca. 30-70 nm.

Embodiment 4

A solution of 500 mL distilled $H_2O$ and 13.4 g $NH_4Cl$ (MP Biomedicals LLC) was prepared in a 1000 mL round bottom flask (0.5 M $NH_4Cl$ solution). 5 grams of the material obtained in embodiment 2 is added to this solution. The suspension is then heated under reflux conditions for 4 hours upon stirring. Afterwards, the zeolite in its ammonium form is recovered by centrifugation, washed with distilled water and dried at 60° C. for 24 hours.

Embodiment 5

A solution of 500 mL distilled water and 0.47 g copper acetate (Sigma-Aldrich) was prepared in a PP bottle. 5 grams of the material obtained in embodiment 4 is added to this solution. The suspension is stirred at room temperature in a closed PP bottle for 20 hours. Afterwards, the zeolite in its copper exchanged form is recovered by centrifugation. This procedure is repeated twice. The final material is then washed with distilled water by centrifugation and dried at 60° C. for 48 hours. The Cu-containing MOZ-type zeolite has a copper oxide content of 3.24 wt.-%, and is based on the total weight of the zeolite.

The final zeolite had a molar composition of $SiO_2:Al_2O_3$:$K_2O$:CuO of 7.28:1:0.26:0.28.

Embodiment 6

Catalyst pellets consisting of compressed zeolite powder obtained in Embodiment 5 are loaded in a quartz fixed bed tubular continuous flow reactor with on-line reaction product analysis. The catalyst first undergoes a pretreatment under simulated air flow conditions, i.e. 5% $O_2$ and 95% $N_2$, at 450° C., the highest temperature of the catalytic testing. After pretreatment, the catalyst temperature is decreased to 150° C. A typical gas composition for $NH_3$—SCR performance evaluation consists of 500 ppm NO, 450 ppm $NH_3$, 5% $O_2$, 2% $CO_2$, 2.2% $H_2O$. The gas hourly space velocity (GHSV) will be fixed at 30 000 $h^{-1}$, obtained with 0.5 $cm^3$ catalyst bed and a gas flow of 250 mL/min. The temperature will be stepwise increased from 150 to 450° C. with fixed temperature ramps, and 50° C. intervals. Isothermal periods of 60 to 120 minutes are foreseen before reaction product sampling at each temperature plateau. A return point to 150° C. enables detection of degradation of catalytic performance during the testing.

The results are shown in FIG. 1.

Table 1 shows the $NO_x$ conversion for each temperature measured.

TABLE 1

$NO_x$ conversion of the zeolite powder obtained in Embodiment 5. The gas composition consisted of 500 ppm NO, 450 ppm $NH_3$, 5% $O_2$, 2% $CO_2$, 2.2% $H_2O$, and the gas hourly space velocity (GHSV) was fixed at 30 000 $h^{-1}$, obtained with 0.5 $cm^3$ catalyst bed and a gas flow of 250 mL/min. The bottom row of the table shows the $NO_x$ conversion at the return point of 150° C. The bottom row demonstrates that there was no degradation of catalytic performance during the testing as the $NO_x$ conversion did not decrease in comparison to the start. The start was also at 150° C., see top row, and the $NO_x$ conversion rates at the start and at the end (top and bottom row) were almost identical.

| Temperature (° C.) | $NO_x$ conversion (%) |
| --- | --- |
| 150 | 66.6 |
| 175 | 93.3 |
| 200 | 100.0 |
| 250 | 100.0 |
| 300 | 96.6 |
| 350 | 85.8 |
| 400 | 85.6 |
| 450 | 86.0 |
| 150 | 67.9 |

Embodiment 7

A solution of 500 mL distilled $H_2O$ and 13.4 g $NH_4Cl$ (MP Biomedicals LLC) was prepared in a 1000 mL round bottom flask (0.5 M NH₄Cl solution). 5 grams of the material obtained in embodiment 1 is added to this solution. The suspension is stirred and heated under reflux conditions for 4 hours. The zeolite is recovered and this procedure is repeated twice. Afterwards, the zeolite in its ammonium form is recovered by centrifugation, washed with distilled water and dried at 60° C. for 24 hours.

The ammonium exchanged material is loaded with different amounts of copper via liquid ion exchange using different concentrations of aqueous copper acetate solutions. The ammonium exchanged material was divided into four aliquots of 1 gram and suspended in solutions of 0.031, 0.094, 0.188 and 0.283 g copper acetate (Sigma-Aldrich) dissolved in 100 mL of distilled water. The suspensions are stirred at room temperature in a closed PP bottle for 20 hours. Afterwards, the zeolite in its copper exchanged form is recovered by centrifugation. This copper exchange procedure is repeated for the materials exchanged with the three highest copper acetate concentrations. The final materials are recovered and washed with distilled water by centrifugation and dried at 60° C. for 48 hours. The four Cu-exchanged zeolites have a copper oxide content, based on the total weight of the zeolite, of 1.3 wt.-%, 3.3 wt.-%, 4.0 wt.-%, 4.4 wt.-%, increasing accordingly with concentration of copper acetate in the exchange solutions.

Zeolites were converted into catalyst pellets and tested for $NH_3$-SCR according to the procedure in Embodiment 6. Table 2 shows $NO_x$ conversion for the respective zeolites in function of temperature.

Figure 2:
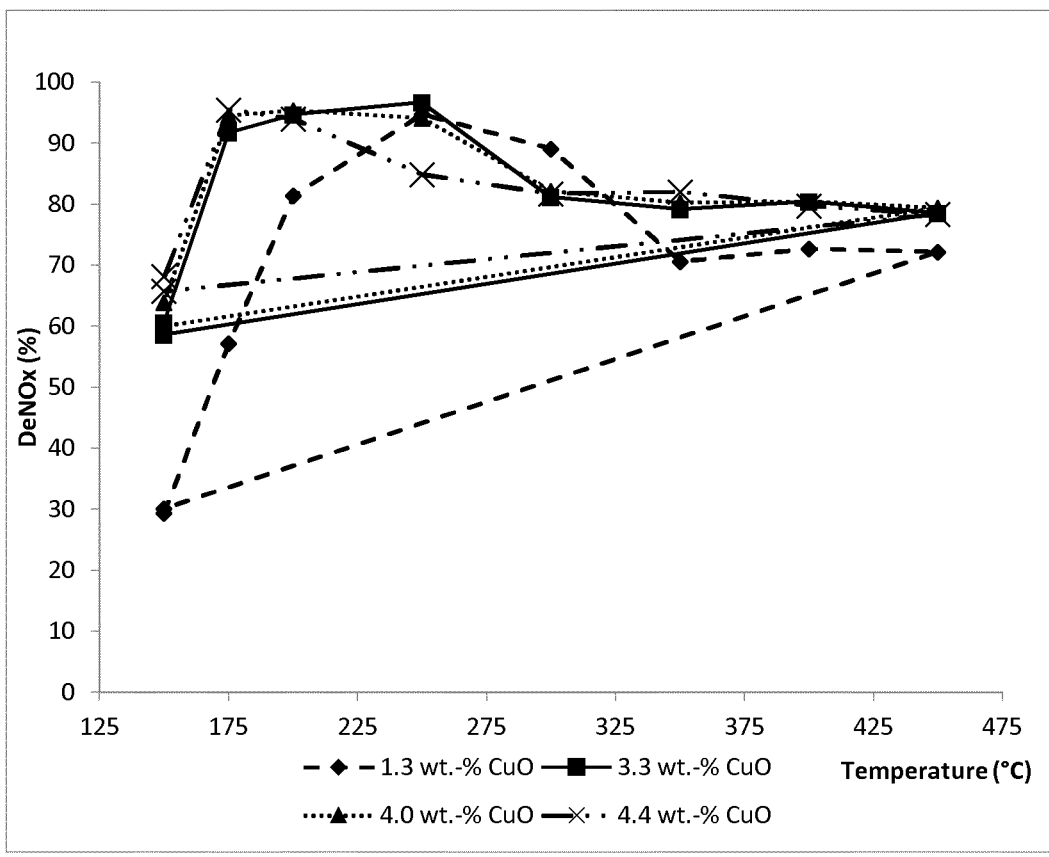
FIG. 2 shows the graphical representation of the NO$_x$ conversion test performed in Embodiment 7.

The results are shown in FIG. 2.

TABLE 2

$NO_x$ conversion of the zeolite powders obtained in Embodiment 7. The gas composition consisted of 500 ppm NO, 450 ppm $NH_3$, 5% $O_2$, 2% $CO_2$, 2.2% $H_2O$, and the gas hourly space velocity (GHSV) was fixed at 30 000 $h^{-1}$, obtained with 0.5 cm³ catalyst bed and a gas flow of 250 mL/min. The bottom row of the table shows the $NO_x$ conversion at the return point of 150° C. The bottom row demonstrates that there was no degradation of catalytic performance during the testing as the $NO_x$ conversion did not decrease in comparison to the start. The start was also at 150° C., see top row in FIG. 2, and the $NO_x$ conversion rates at the start and at the end (top and bottom row in FIG. 2) were almost identical.

| Temperature (° C.) | $NO_x$ conversion (%) | | | |
|---|---|---|---|---|
| | 1.3 wt.-% CuO | 3.3 wt.-% CuO | 4.0 wt.-% CuO | 4.4 wt.-% CuO |
| 150 | 29.4 | 60.5 | 64.0 | 68.2 |
| 175 | 57.2 | 91.7 | 94.6 | 95.5 |
| 200 | 81.4 | 94.7 | 95.4 | 94.0 |
| 250 | 94.8 | 96.6 | 94.1 | 84.9 |
| 300 | 89.1 | 81.1 | 82.2 | 81.7 |
| 350 | 70.6 | 79.1 | 80.3 | 82.0 |
| 400 | 72.7 | 80.3 | 80.5 | 79.7 |
| 450 | 72.2 | 78.5 | 79.4 | 78.4 |
| 150 | 30.2 | 58.6 | 60.0 | 65.8 |

The invention claimed is:

1. Crystalline aluminosilicate zeolites consisting of a framework in which the tetravalent element is silicon and said framework comprises a MOZ framework type, wherein the MOZ framework type contains 3 to 5 wt.-% copper, calculated as CuO and based on the total weight of the respective zeolite.

2. Crystalline aluminosilicate zeolites according to claim 1, wherein the silica to alumina molar ratio ranges from 5 to 30.

3. Crystalline aluminosilicate zeolites according to claim 1, wherein the copper to aluminium atomic ratio is in the range of between 0.003 to 0.5.

4. Crystalline aluminosilicate zeolites according to claim 1, wherein the zeolites comprise one or more cations selected from the group consisting of ammonium, and cations of at least one alkali or alkaline earth metal selected from lithium, sodium, potassium rubidium, cesium, ammonium, magnesium, calcium, strontium, and barium in an amount of 0.3 to 9 wt.-%, calculated as pure metals and based on the total weight of the zeolites.

5. Crystalline aluminosilicate zeolites according to claim 1, wherein the MOZ framework type is ZSM-10.

6. A process for making the crystalline aluminosilicate zeolites according to claim 1, comprising the following steps:
   a) preparing a first aqueous reaction mixture comprising a silica source and potassium hydroxide,
   b) preparing a second aqueous reaction mixture comprising
      potassium hydroxide,
      an alumina source,
      a structure-directing agent selected from N,N'-1,4-dimethyl-1,4-diazoniabicyclo-[2.2.2]octane difluoride, N,N'-1,4-dimethyl-1,4-diazoniabicyclo-[2.2.2]octane dichloride, N,N-'1,4-dimethyl-1,4-diazoniabicyclo-[2.2.2]octane dibromide, N,N'-1,4-dimethyl-1, 4-diazoniabicyclo-[2.2.2]octane diiodide, N,N'-1,4-dimethyl-1,4-diazoniabicyclo-[2.2.2]octane dihydroxide and mixtures thereof,
   c) combining the two aqueous reaction mixtures,
   d) aging the reaction mixture obtained in step c),
   e) heating the mixture,
   f) recovering, washing and drying the zeolite obtained in step e),
   g) calcining the zeolite,
   h) introducing of Cu,
   i) washing and drying the copper containing zeolite obtained in step h).

7. A process for making the crystalline aluminosilicate zeolites according to claim 6, wherein the second aqueous reaction mixture comprises 1.5 to 5 wt.-% of aluminium, calculated as pure aluminium metal per weight of the alkali or alkaline earth metal hydroxide solution.

8. A process for making the crystalline aluminosilicate zeolites according to claim 6, wherein the structure-directing agent is selected from N,N'-1,4-dimethyl-1,4-diazoniabicyclo-[2.2.2]octane diiodide, N,N'-1,4-dimethyl-1,4-diazoniabicyclo-[2.2.2]octane dihydroxide and mixtures thereof.

9. A process for making the crystalline aluminosilicate zeolites according to claim 6, wherein the structure-directing agent is used in a concentration of 0.3 to 0.6 mole per mole of the aluminium source.

10. A process for making the crystalline aluminosilicate zeolites according to claim 6, wherein the calcination in step g) is carried out at temperatures between 500 and 600° C.

11. A process for making the crystalline aluminosilicate zeolites according to claim 6, wherein the introduction of copper in step h) is carried out by performing an $NH_4^+$ liquid ion exchange first, followed by a $Cu_2^+$ liquid ion exchange, incipient wetness impregnation or solid state exchange of Cu.

12. A coating suspension comprising a crystalline aluminosilicate zeolite according to claim 1.

13. A method of selective catalytic reduction of nitrogen oxides, which comprises contacting the nitrogen oxides with a reductant in the presence of a crystalline aluminosilicate zeolite according to claim 1.

14. An SCR catalyst comprising a crystalline aluminosilicate zeolite according to claim 1.

15. An SCR catalyst comprising the coating suspension according to claim 12.

16. An exhaust gas purification system containing an SCR catalyst according to claim 14.

* * * * *